No. 739,974. PATENTED SEPT. 29, 1903.
A. C. BADGER.
JOINT FOR SHEET METAL RECEPTACLES.
APPLICATION FILED DEC. 11, 1901.
NO MODEL.
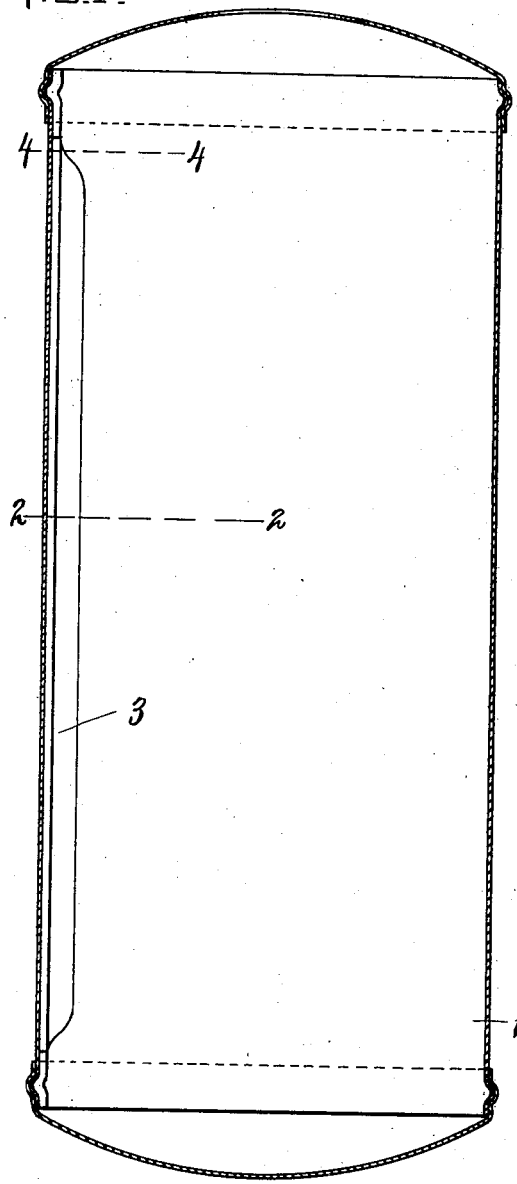
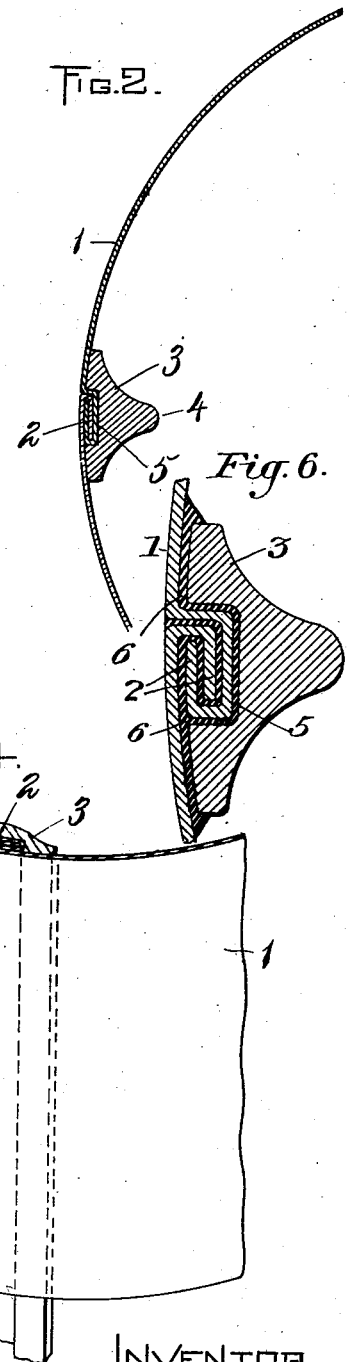
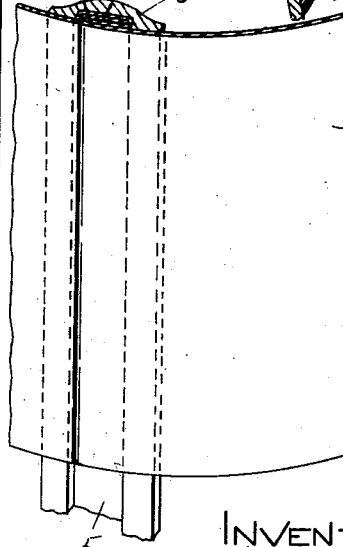
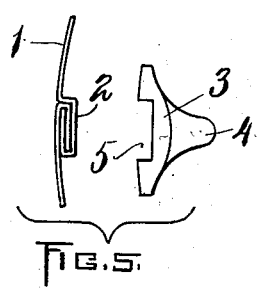
WITNESSES.
P. W. Pezzetti
George Pezzetti.
INVENTOR
Arthur C. Badger
by Wright, Brown & Quinby
atty.

No. 739,974. Patented September 29, 1903.

UNITED STATES PATENT OFFICE.

ARTHUR C. BADGER, OF BOSTON, MASSACHUSETTS.

JOINT FOR SHEET-METAL RECEPTACLES.

SPECIFICATION forming part of Letters Patent No. 739,974, dated September 29, 1903.

Application filed December 11, 1901. Serial No. 85,439. (No model.)

*To all whom it may concern:*

Be it known that I, ARTHUR C. BADGER, of Boston, in the county of Suffolk and State of Massachusetts, have invented certain new and useful Improvements in Joints for Sheet-Metal Receptacles, of which the following is a specification.

This invention relates to sheet-metal receptacles—such, for instance, as the bodies of chemical fire-extinguishers—designed to withstand a heavy internal fluid-pressure; and its object is to strengthen the joints between the portions of the sheet-metal walls of such receptacles. A common method of uniting the edges of the metal is by means of a double-lapped or interlocked soldered seam, and various attempts have been made to reinforce such seams, so as to make them as strong as the main portion of the metal walls. One method is to cause a sheet-metal reinforcing-strip to interlock with the turned edges of the metal walls. Another way of reinforcing is to form an ordinary interlocked seam and build up a thick reinforcing-ridge of solder over the seam. None of these methods have been found adequate in practice, as the seams usually part at high pressures before the limit of strength of the sheet metal has been reached. The difficulty is that the separating strains exerted on the edges of the metal tend to unfold the seam, and when the solder once gives away at one point the action is progressive or of a tearing nature and the seam is easily disrupted, the reinforcement being of insufficient strength or not applied in a proper manner to withstand the strain on the seam. I overcome these difficulties by soldering the main wall portions of the receptacle on both sides of the seam to a rigid reinforcing member of sufficient stiffness to withstand the strains which tend to unroll the seam, and by thus transferring the strains to this member I relieve the seam and prevent it from parting.

Of the accompanying drawings, Figure 1 represents a longitudinal sectional view of a receptacle constructed according to my invention. Fig. 2 represents a section on line 2 2 of Fig. 1 on an enlarged scale. Fig. 3 represents a perspective view of the reinforcing member. Fig. 4 represents a perspective view of the joint, partly in section, on line 4 4 of Fig. 1. Fig. 5 represents a plan view of the seam and reinforcing member separated. Fig. 6 represents an enlarged sectional view of the joint, showing the solder.

The same reference characters indicate the same parts in all the figures.

In the drawings, 1 represents a receptacle, such as the body of a fire-extinguisher, whose walls are made of sheet metal, the meeting edges of which are bent to make an interlocked or double-lapped seam 2, forming a longitudinal bead or ridge on the inside of the receptacle. The meeting edges are tinned in the usual manner before the seam is formed, so that when heat is applied the solder will flow and unite the portions of the seam.

3 is a reinforcing member or bar applied to the seam 2 and made of sufficient inherent stiffness to remain rigid under all bursting pressures to which the receptacle may be subjected within the limits of the reasonable strength of its sheet-metal walls, said bar having a ridge 4 on its back to strengthen it, and also having a recess 5 of sufficient size to admit the inwardly-projecting seam and side portions or flanks abutting the body walls on both sides of the seam.

After the member 3 has been applied in place it is soldered to the seam 2 and to the immediately-adjacent portions of the walls of the receptacle, preferably by the method of sweating, which consists in heating the parts whose adhering surfaces have been previously tinned, until the solder flows and unites all the opposing surfaces. The solder is shown at 6 in Fig. 6. It is evident that the disrupting strains due to pressure within the vessel, which are mainly exerted on the seam circumferentially of the receptacle 1, whereby the united edges of its sheet-metal walls tend to pull apart and unroll the seam 2, are transmitted from the portions of said walls on either side of the seam directly to the reinforcing member 3 through the solder which unites said portions to the flanks of said member. The seam itself is thereby to a large extent relieved from the disrupting effect of these strains and prevented from unrolling. Such reinforcing effect is also supplemented by the fact that the seam itself within the recess 5 is united to the walls of said recess by the solder, and the seam is confined and prevented from pulling apart by the abutments formed by the sides of the recess.

I am aware that it has been proposed to construct a sheet-metal barrel whose halves are joined in the middle by a seam confined in a recess in an internal stiffening-hoop, and I do not claim such structure as my invention.

I claim—

A receptacle designed to withstand heavy fluid-pressures and comprising in its construction a tubular body provided with walls of sheet metal whose edges are joined by a longitudinal soldered seam projecting within the receptacle, an inherently-rigid longitudinal reinforcing member bridging the seam and having flanks abutting the receptacle-walls on both sides of the seam, and solder uniting the seam to the middle portion of said member and uniting said flanks to the laterally-adjacent wall portions, whereby strains tending to separate the united wall portions are borne mainly by the reinforcing member and not by the seam.

In testimony whereof I have affixed my signature in presence of two witnesses.

ARTHUR C. BADGER.

Witnesses:
R. M. PIERSON,
P. W. PEZZETTI.